United States Patent
Cao et al.

(10) Patent No.: US 11,939,166 B2
(45) Date of Patent: Mar. 26, 2024

(54) DIFFERENTIAL TRAVELING ROLLER DRIVEN BY BUILT-IN OUTER ROTOR MOTOR

(71) Applicant: Greenman Machinery Company, Beijing (CN)

(72) Inventors: Huichang Cao, Beijing (CN); Min Li, Beijing (CN); Baobing Du, Beijing (CN)

(73) Assignee: Greenman Machinery Company, Beijing (CN)

( * ) Notice: Subject to any disclaimer, the term of this patent is extended or adjusted under 35 U.S.C. 154(b) by 164 days.

(21) Appl. No.: 17/695,871

(22) Filed: Mar. 16, 2022

(65) Prior Publication Data

US 2022/0204279 A1 Jun. 30, 2022

Related U.S. Application Data

(63) Continuation of application No. PCT/CN2021/075397, filed on Feb. 5, 2021.

(30) Foreign Application Priority Data

Dec. 25, 2020 (CN) .......................... 202011558347.X (51) Int. Cl.
  *B65G 23/08* (2006.01)
  *F16D 41/16* (2006.01)
  *H02K 7/116* (2006.01)

(52) U.S. Cl.
  CPC ............. *B65G 23/08* (2013.01); *F16D 41/16* (2013.01); *H02K 7/116* (2013.01)

(58) Field of Classification Search
  CPC ......... B65G 23/08; B65G 23/24; F16H 48/00; H02K 7/10; H02K 7/116
  (Continued)

(56) References Cited

U.S. PATENT DOCUMENTS

| 5,088,596 A * | 2/1992 | Agnoff ................. B65G 13/073 198/788 |
| 6,672,449 B2 * | 1/2004 | Nakamura ............. H02K 5/225 198/788 |

(Continued)

FOREIGN PATENT DOCUMENTS

| CN | 201466867 U | 5/2010 |
| CN | 204055356 U | 12/2014 |

(Continued)

*Primary Examiner* — Leslie A Nicholson, III
(74) *Attorney, Agent, or Firm* — Bayramoglu Law Offices LLC (57) ABSTRACT

A traveling roller includes a left roller, a right roller, a support shaft, a driving device and a sealing device, wherein the traveling roller may also include an intermediate roller; the support shaft is provided on an axis of the left and right rollers; inner walls of the left and right rollers are respectively connected to support plates; an outer ring of each of the support plates is provided with a notch for dust to flow out; the driving device includes an outer rotor motor sleeved on the support shaft; transmission devices are provided between two end cap seats of a rotor body of the outer rotor motor and the support plates; pawl members of the transmission devices are fixedly sleeved on the end cap seats, or driving planetary gears of the transmission devices are fixed to the rotor body.

16 Claims, 6 Drawing Sheets

(58) Field of Classification Search
USPC .................................. 198/786, 788, 789, 791
See application file for complete search history.

(56) References Cited

U.S. PATENT DOCUMENTS

| | | | |
|---|---|---|---|
| 6,692,398 | B1 | 2/2004 | Sullivan |
| 7,510,073 | B2 * | 3/2009 | Kanaris ................ H02K 7/1012 198/780 |
| 8,460,149 | B1 * | 6/2013 | Chemelli ................ F16H 48/40 475/230 |
| 9,873,568 | B2 * | 1/2018 | Wolters .................. H02K 1/279 |
| 2003/0015060 | A1 | 1/2003 | Lee et al. |

FOREIGN PATENT DOCUMENTS

| | | |
|---|---|---|
| CN | 205531496 U | 8/2016 |
| CN | 107448576 A | 12/2017 |
| CN | 108412981 A | 8/2018 |
| CN | 214069739 U | 8/2021 |
| IN | 105059389 A | 11/2015 |

* cited by examiner

DIFFERENTIAL TRAVELING ROLLER DRIVEN BY BUILT-IN OUTER ROTOR MOTOR

CROSS REFERENCE TO THE RELATED APPLICATIONS

This application is the continuation application of International Application No. PCT/CN2021/075397, filed on Feb. 5, 2021, which is based upon and claims priority to Chinese Patent Application No. 202011558347.X, filed on Dec. 25, 2020, the entire contents of which are incorporated herein by reference.

TECHNICAL FIELD

The present disclosure relates to a differential traveling roller driven by a built-in outer rotor motor.

BACKGROUND

The shaft of the traditional traveling roller is driven by an engine or a motor through a chain or belt, and a differential device or a ratchet and pawl device is provided in the traveling roller. Alternatively, the shaft of the traditional traveling roller is driven by an engine or a motor through an external differential device. Due to the existence of the transmission system, the traditional traveling roller has a complicated structure, low transmission efficiency and a large system weight. In addition, due to the gap between the rollers, the system has a poor sealing effect, such that dust is more likely to enter the inside of the traveling roller to cause wear of the differential device.

SUMMARY

In order to solve the above technical problems, an objective of the present disclosure is to provide a differential traveling roller driven by a built-in outer rotor motor. The present disclosure has a simple structure and adopts an outer rotor motor drive mode. The present disclosure partially integrates differential mechanisms on a rotor of the outer rotor motor, thereby achieving the purpose of traveling and steering. In addition, the present disclosure adopts a built-in sealing structure to prevent dust from entering a differential device.

In order to achieve the above objective, the present disclosure adopts the following technical solutions.

A differential traveling roller driven by a built-in outer rotor motor includes a left roller, a right roller, a support shaft, and a driving device and a sealing device provided in an inner cavity of the left and right rollers, wherein a sealing structure is formed between the left roller and the right roller; the support shaft is provided on an axis of the left and right rollers; an inner wall of the left roller is connected to a left support plate, and an inner wall of the right roller is connected to a right support plate; an outer ring of each of the support plates is provided with a notch for dust to flow out; the driving device includes an outer rotor motor sleeved on the support shaft; two end walls of a rotor body of the outer rotor motor are respectively connected to end cap seats; transmission devices are respectively provided between the end cap seats and the corresponding support plates on corresponding sides; pawl members of the transmission devices are fixedly sleeved on the end cap seats; ratchet wheel members of the transmission devices are connected to the corresponding support plates; the sealing device is provided between the left and right support plates and is circumferentially provided outside the rotor body of the outer rotor motor; left and right supporting sealing plates are provided on the support shaft at ends of the left and right rollers, respectively; and an end of the support shaft is provided with a flat position to prevent the support shaft from rotating.

A differential traveling roller driven by a built-in outer rotor motor includes a left roller, a right roller, a support shaft, and a driving device and a sealing device provided in an inner cavity of the left and right rollers, wherein a sealing structure is formed between the left roller and the right roller; the support shaft is provided on an axis of the left and right rollers; an inner wall of the left roller is connected to a left support plate, and an inner wall of the right roller is connected to a right support plate; an outer ring of each of the support plates is provided with a notch for dust to flow out; the driving device includes an outer rotor motor sleeved on the support shaft, a motor end cap and a transmission device; the motor end cap is connected to an end wall of the outer rotor motor; a driving planetary gear shaft of the transmission device is fixedly connected to a side wall of a rotor body of the outer rotor motor; a driven side gear of the transmission device is connected to a corresponding support plate; the sealing device is provided between the left and right support plates and is circumferentially provided outside the driving planetary gear; left and right supporting sealing plates are respectively provided on the support shaft at ends of the left and right rollers; and an end of the support shaft is provided with a flat position to prevent the support shaft from rotating.

A differential traveling roller driven by a built-in outer rotor motor includes a left roller, an intermediate roller, a right roller, a support shaft, and a driving device and sealing devices provided in an inner cavity of the left, intermediate and right rollers, wherein sealing structures are respectively formed between the intermediate roller and the left and right rollers; the support shaft is provided on an axis of the left, intermediate and right rollers; an inner wall of the left roller is connected to a left support plate, and an inner wall of the right roller is connected to a right support plate; an outer ring of each of the support plates is provided with a notch for dust to flow out; the driving device includes an outer rotor motor sleeved on the support shaft; two end walls of a rotor body of the outer rotor motor are respectively connected to end cap seats; transmission devices are respectively provided between the end cap seats and the corresponding support plates on corresponding sides; a side wall of the rotor body of the outer rotor motor is integrally connected to the intermediate roller; the transmission devices each include pawl members fixedly sleeved on the end cap seats and ratchet wheel members connected to the corresponding support plates; the sealing devices are provided between the support plates and the end cap seats; left and right supporting sealing plates are provided on the support shaft at ends of the left and right rollers, respectively; and an end of the support shaft is provided with a flat position to prevent the support shaft from rotating.

The pawl members of the transmission devices each may include pawls and a pawl seat; the pawl seat may include a fixing ring sleeve fixed to a small-diameter section of a corresponding end cap seat; a large-diameter section of the end cap seat may be fixedly connected to a corresponding end wall of the rotor body of the outer rotor motor by a bolt; at least three mounting ring grooves may be evenly spaced apart and circumferentially provided in an outer wall of the fixing ring sleeve; the pawls may be respectively rotatably mounted in the mounting ring grooves; the pawls each may be provided with a round head and a pointed tail; the round head may be rotatably inserted into a corresponding mounting ring groove, and a body portion extends out through an opening of the mounting ring groove; when the traveling roller rotates, the body portion swings along the opening due to gravity; the ratchet wheel members each may include a wheel frame sleeve and ratchet teeth; an inner ring of the wheel frame sleeve may include a large-hole wall A; the ratchet teeth may be evenly spaced apart and circumferentially provided on the large-hole wall A and correspond to the pointed tails of the pawls; an outer ring of the wheel frame sleeve may include a large-diameter section A and an intermediate-diameter section A; the large-diameter section A may be circumferentially provided with a through hole aligned with a threaded hole of a corresponding support plate; a bolt may be inserted into the aligned threaded hole and the through hole to fixedly connect the ratchet wheel member to the support plate; and the support plate may be sleeved on the intermediate-diameter section A.

A differential traveling roller driven by a built-in outer rotor motor includes a left roller, an intermediate roller, a right roller, a support shaft, and a driving device and sealing devices provided in an inner cavity of the left, intermediate and right rollers, wherein sealing structures are respectively formed between the intermediate roller and the left and right rollers; the support shaft is provided on an axis of the left, intermediate and right rollers; an inner wall of the left roller is connected to a left support plate, and an inner wall of the right roller is connected to a right support plate; an outer ring of each of the support plates is provided with a notch for dust to flow out; the driving device includes an outer rotor motor sleeved on the support shaft and transmission devices; the transmission devices each include a driving planetary gear and a driven side gear; the driving planetary gear is fixed to a side wall of a rotor body of the outer rotor motor through a shaft fixedly connected to the intermediate roller; alternatively, the rotor body of the outer motor is directly fixedly connected to the intermediate roller; the driven side gear is fixedly connected to a corresponding support plate; the sealing devices are provided between the intermediate roller and the support plates; left and right supporting sealing plates are provided on the support shaft at ends of the left and right rollers, respectively; and an end of the support shaft is provided with a flat position to prevent the support shaft from rotating.

Driving planetary gears may be respectively mounted on two corresponding surfaces of the side wall of the rotor body of the outer motor through the shaft, and the surfaces each may be provided with a gear or a set of gears composed of three gears meshed in parallel.

The sealing device may include an annular spacer; the annular spacer may be circumferentially provided outside the outer rotor motor and close to the support plates on both sides; annular stop sleeves may be respectively provided at two ends of the annular spacer; and outer ends of the annular stop sleeves may be respectively clamped on side walls of the wheel frame sleeves or side walls of the driven side gears.

The sealing devices each may include two annular stop sleeves respectively corresponding to the sealing structures between the intermediate roller and the left and right rollers; and outer ends of the annular stop sleeves may be respectively clamped on side walls of the wheel frame sleeves or side walls of the driven side gears, and inner ends thereof extend to and abut against the intermediate roller.

The positioning structure may be a flat position or a key provided at the end of the support shaft.

The present disclosure has the following beneficial effects. The present disclosure adopts an outer rotor motor drive mode. According to the characteristics of the outer rotor motor, the present disclosure integrates part of the transmission devices on the rotor of the outer rotor motor, thereby achieving the purpose of traveling and steering. In addition, the present disclosure adopts a built-in sealing structure to prevent dust from entering the driving device.

BRIEF DESCRIPTION OF THE DRAWINGS

To explain the present disclosure more clearly, the embodiments of the present disclosure are described below with reference to the drawings.

DETAILED DESCRIPTION OF THE EMBODIMENTS

The following embodiments are only used to illustrate the possible implementation aspects of the present disclosure, and they are not intended to limit the protection scope of the present disclosure.

A first preferred embodiment of the present disclosure provides a differential traveling roller driven by a built-in outer rotor motor. As shown in FIGS. 1 to 4, the traveling roller is divided into two parts, namely a left roller 1 and a right roller 2. The left roller 1 and the right roller 2 are hermetically connected. A left support plate 11 is welded to an inner wall of the left roller 1, and a right support plate corresponding to the left support plate 11 is welded to an inner wall of the right roller 2. The left support plate 11 has the same structure as the right support plate. The support plate 11 includes an annular plate body. An outer ring of the annular plate body is welded to the inner walls of the left and right rollers. Multiple notches 111 are spaced apart in the outer ring of the annular plate body. Multiple threaded holes 112 are spaced apart in an inner ring of the annular plate body. A support shaft 3 is inserted at a center axis of the left and right rollers. Left and right supporting sealing plates 9 are sleeved on the support shaft at ends of the left and right rollers, respectively. The supporting sealing plates are respectively welded to the inner walls of the left and right rollers. An outer rotor motor 4 is fixedly sleeved on a middle part of the support shaft 3. Two end walls of a rotor body 41 of the outer rotor motor 4 are respectively fixedly connected to end cap seats 5 by bolts. An inner ring of each of the end cap seats 5 includes a large-hole wall, a limiting-hole wall and a small-hole wall. A first bearing 10 is provided between the large-hole wall and the support shaft. The limiting-hole wall and the small-hole wall are sleeved on the support shaft. The limiting-hole wall is used for positioning an outer ring of the first bearing 10. An outer ring of each of the end cap seats 5 includes a large-diameter section 51, a transition section, a small-diameter section 52 and a positioning section. The large-diameter section 51 is fixedly connected to an end wall of the rotor body 41 of the outer rotor motor by a bolt. A pawl member 6 includes pawls 61 and a pawl seat 62. The pawl seat 62 includes a fixing ring sleeve 621 fixed to the small-diameter section 52. At least three mounting ring grooves 622 are spaced apart and circumferentially provided on an outer wall of the fixing ring sleeve 621. The pawls 61 are respectively rotatably mounted in the mounting ring grooves 622. Each of the pawls 61 is provided with a round head and a pointed tail. The round head is rotatably inserted into the mounting ring groove, and a body portion extends out through an opening of the mounting ring groove. When the roller rotates, the body portion can swing along the opening due to gravity. A ratchet wheel member 7 includes a wheel frame sleeve and ratchet teeth 71. An inner ring of the wheel frame sleeve includes a large-hole wall A72, an intermediate-hole wall A and a small-hole wall A that are stepped. Six ratchet teeth 71 corresponding to the pointed tails of the pawls 61 are spaced apart and circumferentially provided on the large-hole wall A72. The ratchet teeth are square bumps, and a round corner is provided at a connection between each of the bumps and the large-hole wall A. A second bearing 20 is sleeved between the intermediate-hole wall A and the support shaft 3. The small-hole wall A is used for positioning an outer ring of the second bearing, and the positioning section of the corresponding end cap seat is used for positioning an inner ring of the second bearing. An outer ring of the wheel frame sleeve includes a large-diameter section A72, an intermediate-diameter section A73 and a small-diameter section A that are stepped. The large-diameter section A72 is circumferentially provided with through holes 721 aligned with the threaded holes 112. Bolts are inserted through the aligned threaded holes and through holes to make the wheel frame sleeve and the support plate fixedly connected. The support plate is sleeved on the intermediate-diameter section A73 of the wheel frame sleeve. A sealing device is clamped between the left and right support plates. The sealing device is provided outside the rotor body of the outer rotor motor. The sealing device includes an annular spacer 81. Annular stop sleeves 82 are respectively arranged between the annular spacer and the left and right support plates. The annular spacer 81 is circumferentially provided outside the outer rotor motor. The annular spacer includes a round tube body. The annular stop sleeves 82 each include a cone 821. A ring cap 822 of the cone 821 is inserted into a slot of the large-diameter wall of the wheel frame sleeve. A large-diameter end of the cone extends into the round tube body and abuts on the inner wall.

When the traveling roller needs to turn, the power is cut off. According to the principle of the ratchet and pawl, an external force is applied to enable one of the left and right rollers to enter an engaged state and the other a disengaged state, thereby realizing turning. Alternatively, to turn, the motor speed is reduced or maintained. According to the principle of the ratchet and pawl, the external force is increased to enable one of the double rollers to enter an engaged state and the other a disengaged state, thereby realizing turning. The built-in design of the outer rotor motor utilizes the effective space inside the roller to realize a compact structure, and realize the turning purpose while driving. In addition, the sealing is described as follows. The left and right rollers adopt a radial labyrinth seal. The annular spacer is supported by the left and right annular stop sleeves. When dust and other impurities enter the roller through the labyrinth, the annular spacer separates them from the internal structure. As the roller rotates, the impurities enter the notches of the support plate through the annular stop sleeves, thereby effectively preventing the impurities from entering the inside of the working part.

Figure 1:
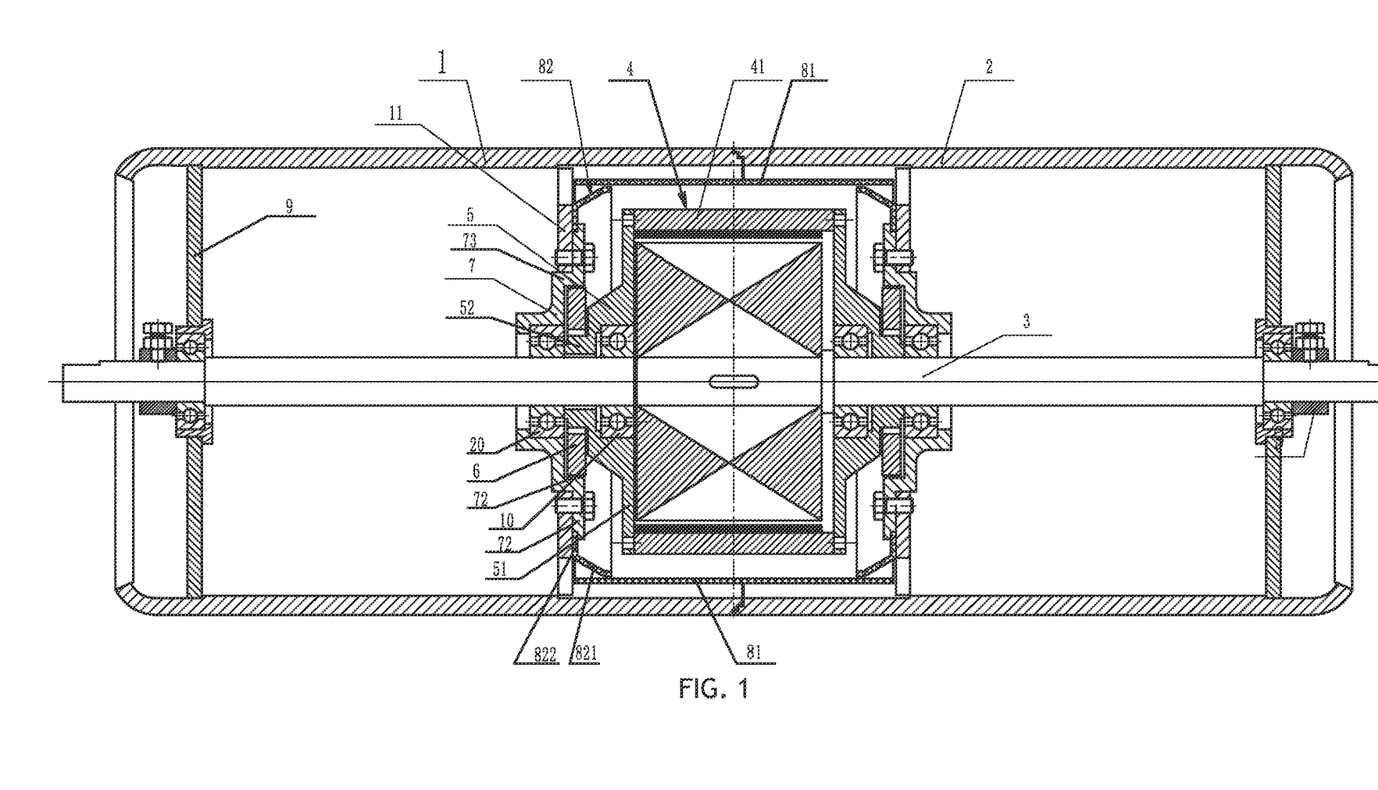
FIG. 1 is a structural view of a first embodiment of the present disclosure.
Figure 2:
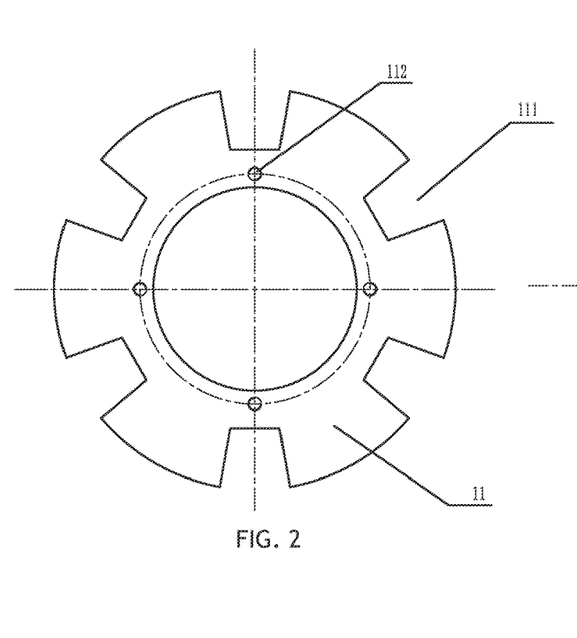
FIG. 2 is a structural view of a support plate according to the present disclosure.
Figure 3:
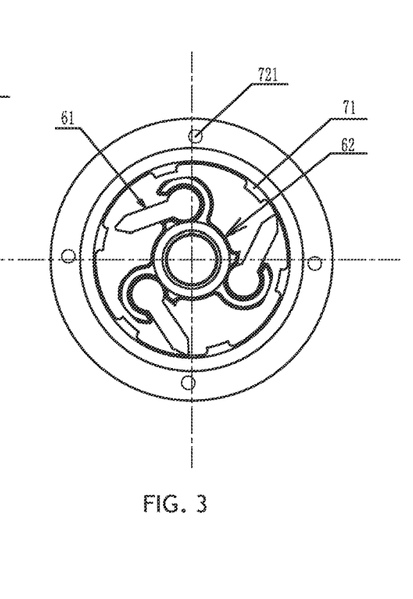
FIG. 3 is a schematic view of a pawl member and a ratchet wheel member that are disengaged according to the present disclosure.
Figure 4:
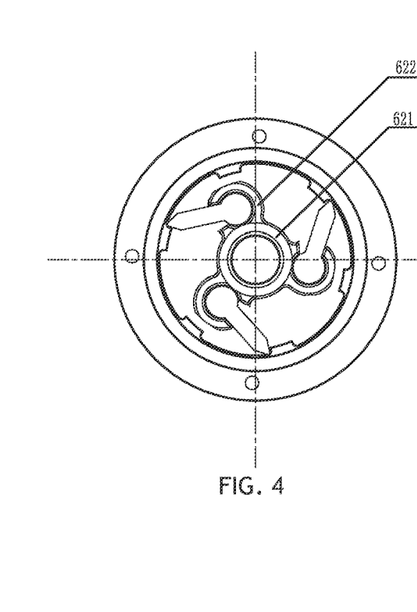
FIG. 4 is a schematic view of a pawl member and a ratchet wheel member that are meshed according to the present disclosure.
Figure 5:
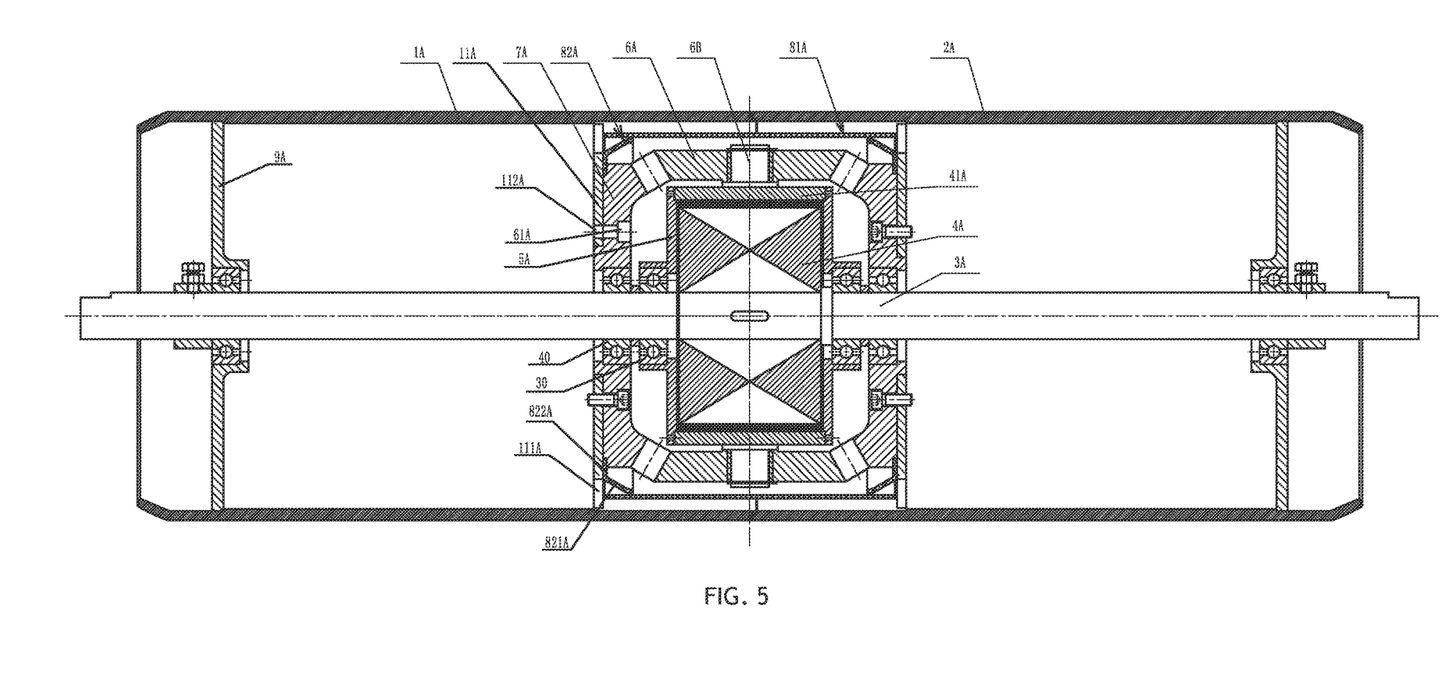
FIG. 5 is a structural view of a second embodiment of the present disclosure.

A second preferred embodiment of the present disclosure provides a differential traveling roller driven by a built-in outer rotor motor. As shown in FIG. 5, the traveling roller includes a left roller 1A and a right roller 2A. The left roller 1A and the right roller 2A are hermetically connected. A left support plate 11A is welded to an inner wall of the left roller 1A, and a right support plate corresponding to the left support plate 11A is welded to an inner wall of the right roller 2A. The left support plate has the same structure as the right support plate. The left support plate 11A includes an annular plate body. An outer ring of the annular plate body is welded to the inner walls of the left and right rollers. Multiple notches 111A are spaced apart in the outer ring of the annular plate body. Multiple threaded holes 112A are spaced apart in an inner ring of the annular plate body. A support shaft 3A is inserted at a center axis of the left and right rollers. Left and right supporting sealing plates 9A are sleeved on the support shaft at ends of the left and right rollers, respectively. The supporting sealing plates are respectively welded to the inner walls of the left and right rollers. An outer rotor motor 4A is fixedly sleeved on a middle part of the support shaft 3A. A transmission device is provided between a rotor body of the outer rotor motor and the support plate 11A. Motor end caps 5A are sleeved on the support shaft on two sides of the outer rotor motor 4A, respectively. A first bearing 30 is provided between each of the motor end caps and the support shaft. The motor end caps 5A and the rotor body 41A of the outer rotor motor 4A are fixedly connected by bolts. The transmission device includes driving planetary gears 6A and driven side gears 7A. Two or six evenly spaced driving planetary gear shafts 6B are fixedly connected to a side wall of the rotor body of the outer rotor motor. The driving planetary gears 6A are respectively sleeved on the driving planetary gear shaft 6B. The driven side gears 7A meshed with the driving planetary gears are sleeved on the support shaft on the two sides of the outer rotor motor. The driven side gears 7A are fixedly sleeved on the support shaft 3A through a second bearing 40. The driven side gears 6A are provided with counterbores 61A aligned with the threaded holes 112A of the support plate 11A, and are fixedly connected by bolts. A sealing device is clamped between the left and right support plates. The sealing device is circumferentially provided outside the driving planetary gears 6A. The sealing device includes an annular spacer 81A. Annular stop sleeves 82A are respectively arranged between the annular spacer and the left and right support plates. The annular spacer 81A is circumferentially provided between the rotor body of the outer rotor motor and the inner walls of the left and right rollers. The annular spacer includes a round tube body. The annular stop sleeves 82A each include a cone 821A. A ring cap 822A of the cone 821A is inserted into a slot of a corresponding driven side gears. A large-diameter end of the cone extends into the round tube body and abuts on the inner wall.

In this embodiment, the revolution of the driving planetary gears is realized by the outer rotor motor. The left and right driven side gears are respectively connected to the left and right rollers. When the active planetary gears revolve, they drive the left and right rollers to rotate. The outer rotor motor is provided at the center of the left and right rollers, and the support shaft is used as a motor shaft and also a support shaft of the left and right rollers. Specifically, the two ends of the support shaft are fixed to a frame by a positioning structure to prevent the support shaft from rotating, and the two ends of the support shaft are integrated with a stator to maintain a static state. The positioning structure includes flat positions provided at the ends of the support shaft or keys provided at the ends of the support shaft. The driving planetary gear shafts and the rotor body are integrated. Two oppositely arranged driving planetary gear shafts are respectively provided with the driving planetary gears. The driving planetary gears can rotate around the driving planetary gear shafts (rotation) and rotate around the stator and the support shaft with the rotor body of the outer motor (revolution). When the traveling roller travels in a straight line, because the left and right rollers receive the same resistance, the driving planetary gears revolve but do not rotate. The connection between the driving planetary gears and the left and right driven side gears is equivalent to a rigid connection, and the speeds of the left and right rollers are the same. When the traveling roller turns, the resistance received by the left and right rollers is different due to an external force, which is fed back to the driven side gears, forcing the driving planetary gears to rotate. The inner roller decelerates or even reverses, while the outer roller accelerates, causing a difference in the speeds of the left and right rollers, so as to realize turning or steering in place. In addition, the sealing is described as follows. The left and right rollers adopt a radial labyrinth seal with the annular spacer and the annular stop sleeves built-in. The annular spacer is supported by the left and right annular stop sleeves. When dust and other impurities enter the roller through the labyrinth, the annular spacer separates them from the internal structure. As the roller rotates, the impurities enter the notches of the support plate through the annular stop sleeves, thereby effectively preventing the impurities from entering the inside of the working part.

Figure 6:
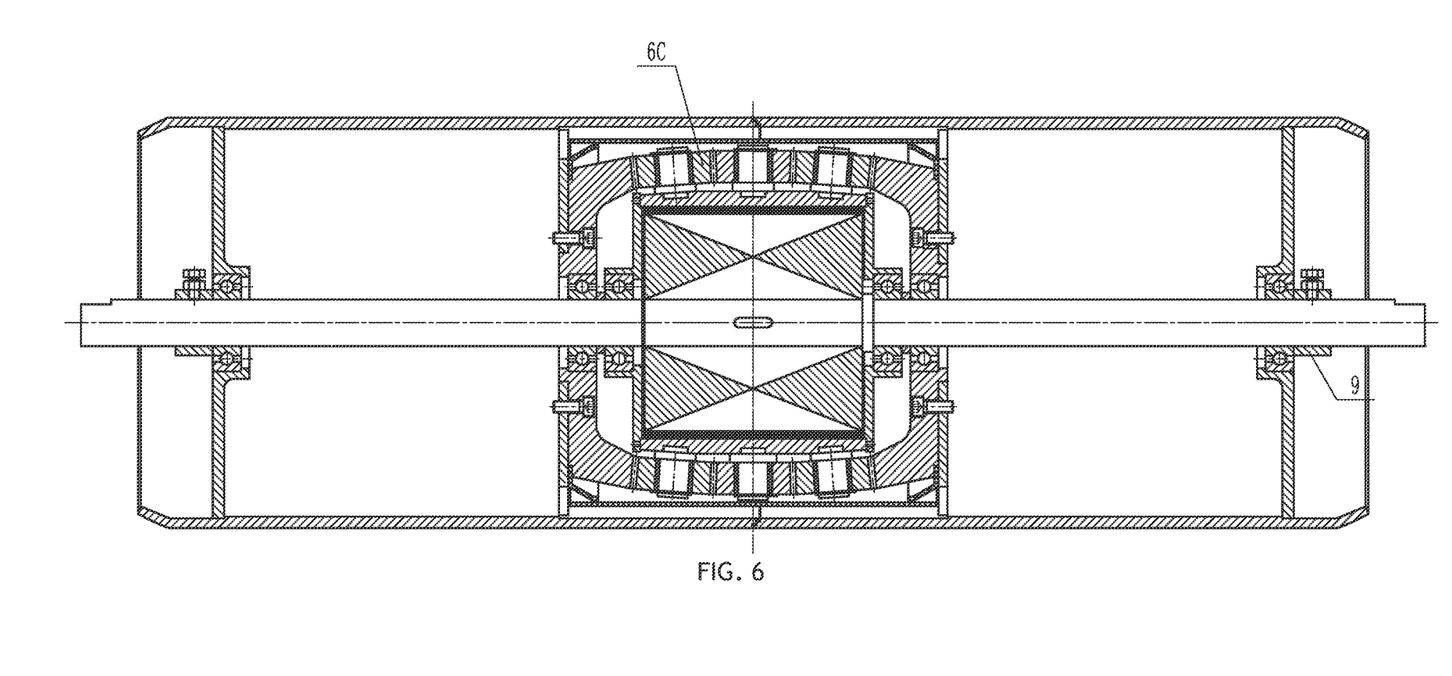
FIG. 6 is a structural view of a third embodiment of the present disclosure.

FIG. 6 shows a third preferred embodiment of the present disclosure. The third preferred embodiment differs from the second preferred embodiment in that the driving planetary gear 6A is replaced with three parallel and meshed small driving planetary gears 6C. The diameter of the single driving planetary gear 6A is too large, resulting in limited radial space and excessive axial space between the roller and the rotor of the outer rotor motor. When the driving planetary gear is replaced with three independent small planetary gears 6C, the problem of space size is solved. When the roller travels in a straight line, the connection of the three gears is equivalent to a rigid connection, and these three gears can be regarded as a whole, thereby driving the rotation of the driven side gears on both sides. When the roller is turning, due to the large resistance of the inner roller, the peripheral driving planetary gears drive the inner driving planetary gears to rotate one by one to complete the turn.

Figure 7:
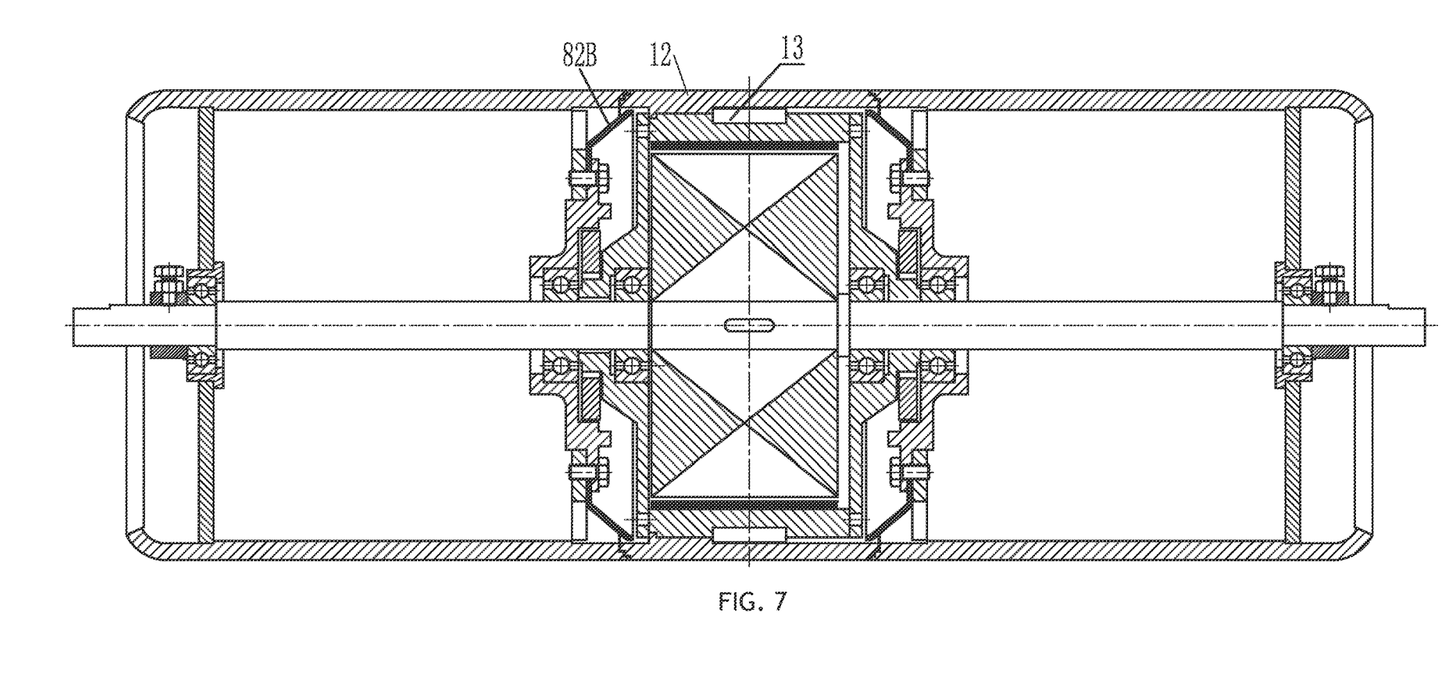
FIG. 7 is a structural view of a fourth embodiment of the present disclosure.

FIG. 7 shows a fourth preferred embodiment of the present disclosure. The difference between the fourth preferred embodiment and the first preferred embodiment is that the traveling roller is divided into three parts, namely a left roller, an intermediate roller 12 and a right roller. The intermediate roller and the left and right rollers form sealing structures respectively. The intermediate roller is shorter, and its length is preferably about 20% that of the entire traveling roller. The rotor body of the outer rotor motor is connected to the inner wall of the intermediate roller through a key 13 or other means. The intermediate roller is integrated with the rotor body of the outer motor and rotates together with the rotor body. When the traveling roller travels in a straight line, the three rollers rotate synchronously. When it needs to turn, the power is cut off. According to the principle of the ratchet and pawl, one of the left and right rollers is in a disengaged state and the other is in an engaged state, and the intermediate roller and the inner roller move synchronously, thereby realizing turning. Alternatively, when the traveling roller needs to turn, the motor speed is reduced or maintained. According to the principle of the ratchet and pawl, an external force is increased to enable one of the left and right rollers to enter an engaged state and the other a disengaged state, and the intermediate roller and the inner roller move synchronously, thereby realizing turning. The sealing device only includes an annular stop sleeve 82B. The annular stop sleeve corresponds to a labyrinth sealing structure. A large-diameter end of the annular stop sleeve extends into and closely abuts against an inner wall of the intermediate roller. When dust enters the roller through the labyrinth, the dust enters the left and right rollers along the annular stop sleeve, thereby effectively protecting the driving device and the transmission device.

Figure 8:
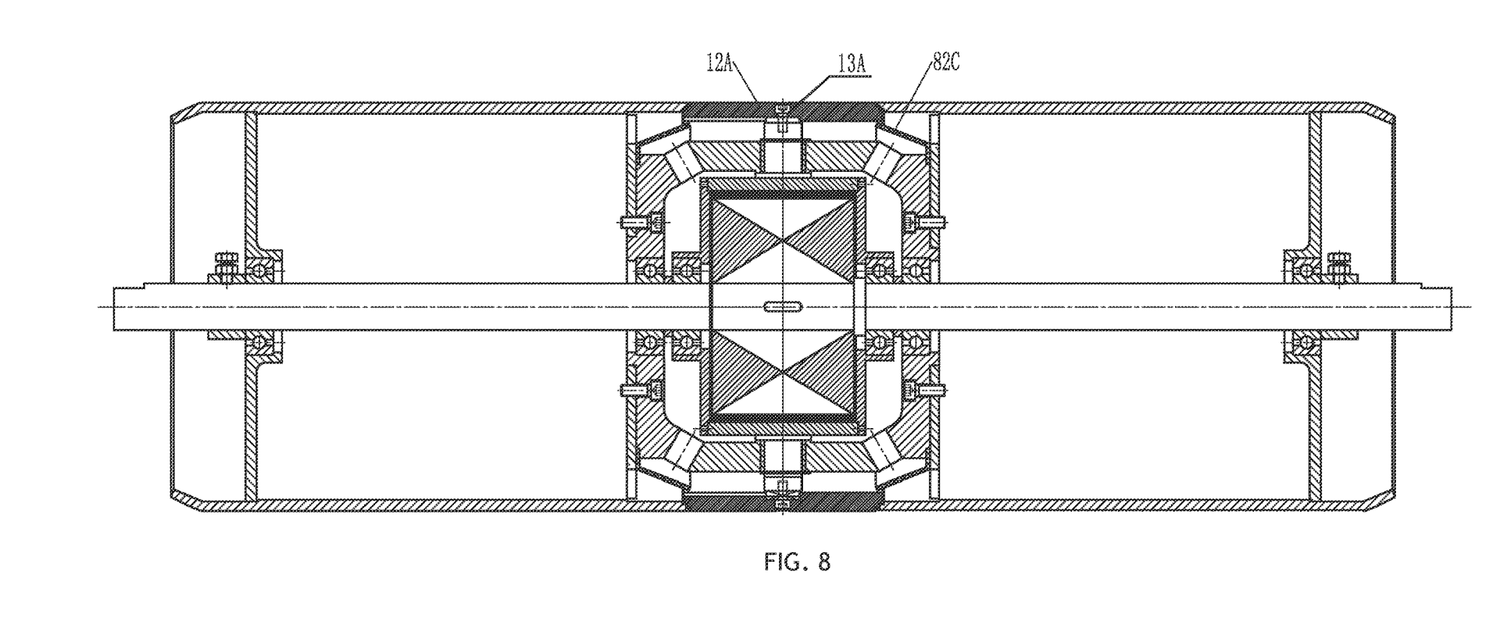
FIG. 8 is a structural view of a fifth embodiment of the present disclosure.

FIG. 8 shows a fifth preferred embodiment of the present disclosure. The difference between the fifth preferred embodiment and the second preferred embodiment is that the traveling roller is divided into three parts, namely a left roller, an intermediate roller 12A and a right roller. The intermediate roller and the left and right rollers form sealing structures respectively. The intermediate roller is shorter, and its length is preferably about 20% that of the entire traveling roller. The driving planetary gear shaft is fixedly connected to the intermediate roller by screws 13A. Alternatively, the driving planetary gear shaft is not connected to the intermediate roller, but the intermediate roller and the rotor body of the outer motor are directly and firmly connected as a whole, such that the intermediate roller rotates with the rotor body. When the traveling roller travels in a straight line, the three rollers rotate synchronously. When the roller turns, the resistance received by the left and right rollers is different due to an external force, which is fed back to the driven side gears, forcing the driving planetary gears to rotate. The inner roller decelerates or even reverses, while the outer roller accelerates, causing a difference in the speeds of the left and right rollers while keeping the speed of the intermediate roller between the speeds of the left and right rollers, so as to realize turning or steering in place. The sealing device only includes an annular stop sleeve 82C. The annular stop sleeve corresponds to a labyrinth sealing structure. A large-diameter end of the annular stop sleeve extends into and closely abuts against an inner wall of the intermediate roller. When dust enters the roller through the labyrinth, the dust enters the left and right rollers along the annular stop sleeve, thereby effectively protecting the driving device and the transmission device.

The present disclosure adopts an outer rotor motor drive mode. According to the characteristics of the outer rotor motor, the present disclosure integrates part of the transmission devices on the rotor of the outer rotor motor, thereby achieving the purpose of traveling and steering. In addition, the present disclosure adopts a built-in sealing structure to prevent dust from entering the driving device and the transmission device.

What is claimed is:
1. A differential traveling roller driven by a built-in outer rotor motor, comprising:
   a left roller;

a right roller;
a support shaft;
a driving device; and
a sealing device,
wherein
the driving device and the sealing device are provided in an inner cavity formed by the left roller and the right roller,
a sealing structure is formed by and between the left roller and the right roller,
the support shaft is provided on an axis of the left roller and the right roller,
an inner wall of the left roller is connected to a left support plate, and an inner wall of the right roller is connected to a right support plate,
an outer ring of each of the left support plate and the right support plate is provided with a notch for dust to flow out,
the driving device comprises an outer rotor motor sleeved on the support shaft,
two end walls of a rotor body of the outer rotor motor are respectively connected to end cap seats,
transmission devices are respectively provided between the end cap seats and the corresponding support plates on corresponding sides,
pawl members of the transmission devices are fixedly sleeved on the end cap seats,
ratchet wheel members of the transmission devices are connected to the corresponding support plates,
the sealing device is provided between the left support plate and the right support plate and is circumferentially provided outside the rotor body of the outer rotor motor,
a left supporting sealing plate and a right supporting sealing plate are provided on the support shaft at ends of the left roller and the right roller, respectively, and
an end of the support shaft is provided with a positioning structure to prevent the support shaft from rotating.

2. The differential traveling roller according to claim 1, wherein
the pawl members of the transmission devices each comprise pawls and a pawl seat,
the pawl seat comprises a fixing ring sleeve fixed to a small-diameter section of a corresponding end cap seat,
a large-diameter section of the end cap seat is fixedly connected to a corresponding end wall of the rotor body of the outer rotor motor by a bolt,
at least three mounting ring grooves are evenly spaced apart and provided circumferentially in an outer wall of the fixing ring sleeve,
the pawls are respectively rotatably mounted in the mounting ring grooves,
the pawls each are provided with a round head, a body portion and a pointed tail,
the round head is rotatably inserted into a corresponding mounting ring groove, and the body portion extends out through an opening of the mounting ring groove,
when the traveling roller rotates, the body portion is configured to swing along the opening due to gravity,
each of the ratchet wheel members comprise a wheel frame sleeve and ratchet teeth,
an inner ring of the wheel frame sleeve comprises a large-hole wall, the ratchet teeth are evenly spaced apart and provided circumferentially on the large-hole wall and correspond to the pointed tails of the pawls,
an outer ring of the wheel frame sleeve comprises a large-diameter section and an intermediate-diameter section,
the large-diameter section is circumferentially provided with a through hole aligned with a threaded hole of a corresponding support plate,
a bolt is inserted into the threaded hole and the through hole to fixedly connect the ratchet wheel member to the corresponding support plate, and
the corresponding support plate is sleeved on the intermediate-diameter section.

3. A differential traveling roller driven by a built-in outer rotor motor, comprising:
a left roller;
a right roller;
a support shaft;
a driving device; and
a sealing device,
wherein
the driving device and the sealing device are provided in an inner cavity formed by the left roller and the right roller,
a sealing structure is formed by and between the left roller and the right roller,
the support shaft is provided on an axis of the left roller and the right roller,
an inner wall of the left roller is connected to a left support plate, and an inner wall of the right roller is connected to a right support plate,
an outer ring of each of the left support plate and the right support plate is provided with a notch for dust to flow out,
the driving device comprises an outer rotor motor sleeved on the support shaft, a motor end cap and a transmission device,
the motor end cap is connected to an end wall of the outer rotor motor,
a shaft of a driving planetary gear of the transmission device is fixedly connected to a side wall of a rotor body of the outer rotor motor,
a driven side gear of the transmission device is connected to a corresponding support plate,
the sealing device is provided between the left support plate and the right support plate and is circumferentially provided outside the driving planetary gear,
a left supporting sealing plate and a right supporting sealing plate are respectively provided on the support shaft at ends of the left roller and the right roller, and
an end of the support shaft is provided with a flat position to prevent the support shaft from rotating.

4. A differential traveling roller driven by a built-in outer rotor motor, comprising:
a left roller;
an intermediate roller;
a right roller;
a support shaft;
a driving device; and
sealing devices,
wherein
the driving device and the sealing devices are provided in an inner cavity formed by the left roller, the intermediate roller and the right roller, sealing structures are respectively formed by and between the intermediate roller and the left roller, and by and between the intermediate roller and the right roller, the support shaft is provided on an axis of the left roller, the intermediate roller and the right roller, an inner wall of the left roller is connected to a left support plate, and an inner wall of the right roller is connected to a right support plate, an outer ring of each of the left support plate and the right support plate is provided with a notch for dust to flow out, the driving device comprises an outer rotor motor sleeved on the support shaft, two end walls of a rotor body of the outer rotor motor are respectively connected to end cap seats, transmission devices are respectively provided between the end cap seats and the corresponding support plates on corresponding sides, a side wall of the rotor body of the outer rotor motor is integrally connected to the intermediate roller, the transmission devices each comprise pawl members fixedly sleeved on the end cap seats and ratchet wheel members connected to the corresponding support plates, the sealing devices are provided between the left support plate and the corresponding end cap seats and between the right support plate and the corresponding end cap seats, a left supporting sealing plate and a right supporting sealing plate are provided on the support shaft at ends of the left roller and the right roller, respectively, and an end of the support shaft is provided with a flat position to prevent the support shaft from rotating.

5. The differential traveling roller according to claim 4, wherein the pawl members of the transmission devices each comprise pawls and a pawl seat, the pawl seat comprises a fixing ring sleeve fixed to a small-diameter section of a corresponding end cap seat, a large-diameter section of the end cap seat is fixedly connected to a corresponding end wall of the rotor body of the outer rotor motor by a bolt, at least three mounting ring grooves are evenly spaced apart and circumferentially provided in an outer wall of the fixing ring sleeve; the pawls are respectively rotatably mounted in the mounting ring grooves, the pawls each are provided with a round head, a body portion and a pointed tail, the round head is rotatably inserted into a corresponding mounting ring groove, and the body portion extends out through an opening of the mounting ring groove, when the traveling roller rotates, the body portion is configured to swing along the opening due to gravity, the ratchet wheel members each comprise a wheel frame sleeve and ratchet teeth; an inner ring of the wheel frame sleeve comprises a large-hole wall, the ratchet teeth are evenly spaced apart and circumferentially provided on the large-hole wall and correspond to the pointed tails of the pawls, an outer ring of the wheel frame sleeve comprises a large-diameter section and an intermediate-diameter section A, the large-diameter section is circumferentially provided with a through hole aligned with a threaded hole of a corresponding support plate, a bolt is inserted into the aligned threaded hole and the through hole to fixedly connect the ratchet wheel member to the support plate, and the support plate is sleeved on the intermediate-diameter section.

6. A differential traveling roller driven by a built-in outer rotor motor, comprising:

a left roller;
an intermediate roller;
a right roller;
a support shaft;
a driving device; and
sealing devices,
wherein
the driving device and the sealing devices are provided in an inner cavity formed by the left roller, the intermediate roller and the right roller, wherein sealing structures are respectively formed by and between the intermediate roller and the left roller, and by and between the intermediate roller and the right roller, the support shaft is provided on an axis of the left roller, the intermediate roller and the right roller, an inner wall of the left roller is connected to a left support plate, and an inner wall of the right roller is connected to a right support plate, an outer ring of each of the support plates is provided with a notch for dust to flow out; the driving device comprises an outer rotor motor sleeved on the support shaft and transmission devices, the transmission devices each comprise a driving planetary gear and a driven side gear, the driving planetary gear is fixed to a side wall of a rotor body of the outer rotor motor through a shaft fixedly connected to the intermediate roller, or the rotor body of the outer motor is directly fixedly connected to the intermediate roller, the driven side gear is fixedly connected to a corresponding support plate, the sealing devices are provided between the intermediate roller and the left support plate, and between the intermediate roller and the right support plate, a left supporting sealing plate and a right supporting sealing plate are provided on the support shaft at ends of the left roller and the right roller, respectively, and an end of the support shaft is provided with a flat position to prevent the support shaft from rotating.

7. The differential traveling roller according to claim 3, wherein the driving planetary gears are respectively mounted on two corresponding surfaces of the side wall of the rotor body of the outer motor through the shaft, and each of the two corresponding surfaces is provided with a gear or a set of gears composed of three gears meshed in parallel.

8. The differential traveling roller according to claim 1, wherein the sealing device comprises an annular spacer, the annular spacer is circumferentially provided outside the outer rotor motor and close to the left support plate and the right support plate on both sides, annular stop sleeves are respectively provided at two ends of the annular spacer, and outer ends of the annular stop sleeves are respectively clamped on side walls of wheel frame sleeves or side walls of driven side gears.

9. The differential traveling roller driven by a built-in outer rotor motor according to claim 4, wherein the sealing devices each comprise two annular stop sleeves respectively corresponding to the sealing structures formed by and between the intermediate roller and the left roller, and formed by and between the intermediate roller and the right roller, and outer ends of the annular stop sleeves are respectively clamped on side walls of wheel frame sleeves or side walls of driven side gears, and inner ends of the annular stop sleeves extend to and abut against the intermediate roller.

10. The differential traveling roller driven by a built-in outer rotor motor according to claim 1, wherein the positioning structure is a flat position or a key provided at the end of the support shaft.

11. The differential traveling roller according to claim 6, wherein the driving planetary gears are respectively mounted on two corresponding surfaces of the side wall of the rotor body of the outer motor through the shaft, and each of the two corresponding surfaces is provided with a gear or a set of gears composed of three gears meshed in parallel.

12. The differential traveling roller according to claim 2, wherein the sealing device comprises an annular spacer, the annular spacer is circumferentially provided outside the outer rotor motor and close to the left support plate and the right support plate on both sides, annular stop sleeves are respectively provided at two ends of the annular spacer, and outer ends of the annular stop sleeves are respectively clamped on side walls of the wheel frame sleeves or side walls of driven side gears.

13. The differential traveling roller according to claim 3, wherein the sealing device comprises an annular spacer, the annular spacer is circumferentially provided outside the outer rotor motor and close to the left support plate and the right support plate on both sides, annular stop sleeves are respectively provided at two ends of the annular spacer, and outer ends of the annular stop sleeves are respectively clamped on side walls of wheel frame sleeves or side walls of the driven side gears.

14. The differential traveling roller according to claim 5, wherein the sealing devices each comprise two annular stop sleeves respectively corresponding to the sealing structures formed by and between the intermediate roller and the left roller, and formed by and between the intermediate roller and the right roller, and outer ends of the annular stop sleeves are respectively clamped on side walls of the wheel frame sleeves or side walls of driven side gears, and inner ends of the annular stop sleeves extend to and abut against the intermediate roller.

15. The differential traveling roller according to claim 6, wherein the sealing devices each comprise two annular stop sleeves respectively corresponding to the sealing structures formed by and between the intermediate roller and the left roller, and formed by and between the intermediate roller and the right roller, and outer ends of the annular stop sleeves are respectively clamped on side walls of wheel frame sleeves or side walls of the driven side gears, and inner ends of the annular stop sleeves extend to and abut against the intermediate roller.

16. The differential traveling roller according to claim 7, wherein the sealing devices each comprise two annular stop sleeves respectively corresponding to the sealing structures formed by and between the intermediate roller and the left roller, and formed by and between the intermediate roller and the right roller, and outer ends of the annular stop sleeves are respectively clamped on side walls of wheel frame sleeves or side walls of driven side gears, and inner ends of the annular stop sleeves extend to and abut against the intermediate roller.

* * * * *